United States Patent [19]

Scholz

[11] 4,406,988

[45] Sep. 27, 1983

[54] CIRCUIT FOR PROCESSING A DIGITAL SIGNAL

[75] Inventor: Werner Scholz, Gehrden, Fed. Rep. of Germany

[73] Assignee: Licentia Patent-Verwaltungs-GmbH, Frankfurt am Main, Fed. Rep. of Germany

[21] Appl. No.: 238,160

[22] Filed: Mar. 2, 1981

[30] Foreign Application Priority Data

Feb. 28, 1980 [DE] Fed. Rep. of Germany ....... 3007502

[51] Int. Cl.³ .......................................... H03K 5/153
[52] U.S. Cl. ................................. 328/150; 307/351; 307/354; 307/358; 328/164
[58] Field of Search .............. 307/351, 354, 358, 542, 307/510, 518, 268; 328/150, 164; 340/146.3 AC, 146.3 AE, 146.3 AG

[56] References Cited

U.S. PATENT DOCUMENTS

| | | |
|---|---|---|
| 3,473,131 | 10/1969 | Perkins, Jr. ........................ 328/164 |
| 3,581,220 | 5/1971 | Bell et al. . |
| 3,942,038 | 3/1976 | Hutch .................................. 307/358 |
| 3,978,284 | 8/1976 | Yoshino et al. . |
| 4,112,381 | 9/1978 | Mortensen et al. ................. 307/358 |
| 4,121,121 | 10/1978 | Gabeler .............................. 307/358 |
| 4,241,455 | 12/1980 | Eibner . |

FOREIGN PATENT DOCUMENTS

| | | |
|---|---|---|
| 2549966 | 5/1977 | Fed. Rep. of Germany . |
| 2406190 | 7/1977 | Fed. Rep. of Germany . |
| 2007231 | 5/1978 | Fed. Rep. of Germany . |
| 2652807 | 5/1978 | Fed. Rep. of Germany . |
| 2853353 | 7/1979 | Fed. Rep. of Germany . |

Primary Examiner—John Zazworsky
Attorney, Agent, or Firm—Spencer, Kaye & Frank

[57] ABSTRACT

In a circuit for processing a useful signal which varies in amplitude between positive and negative values about a zero value and contains information in the locations of its zero passages, which circuit includes: a zero passage detector having an input; a first capacitor connected in series between a source of the useful signal and the detector input; and components for coupling the useful signal with a first equalizing signal during the positive value intervals of the useful signal and with a second equalizing signal during the negative intervals of the useful signal, the coupling components include sources of the two equalizing signals, controllable switches connected to each source for selectively coupling the corresponding equalizing signal with the useful signal; and a control pulse generator means connected for applying to each said switch control pulses derived from the useful signal and having a timing such that each switch is closed for a predetermined period during its associated intervals of the useful signal.

15 Claims, 8 Drawing Figures

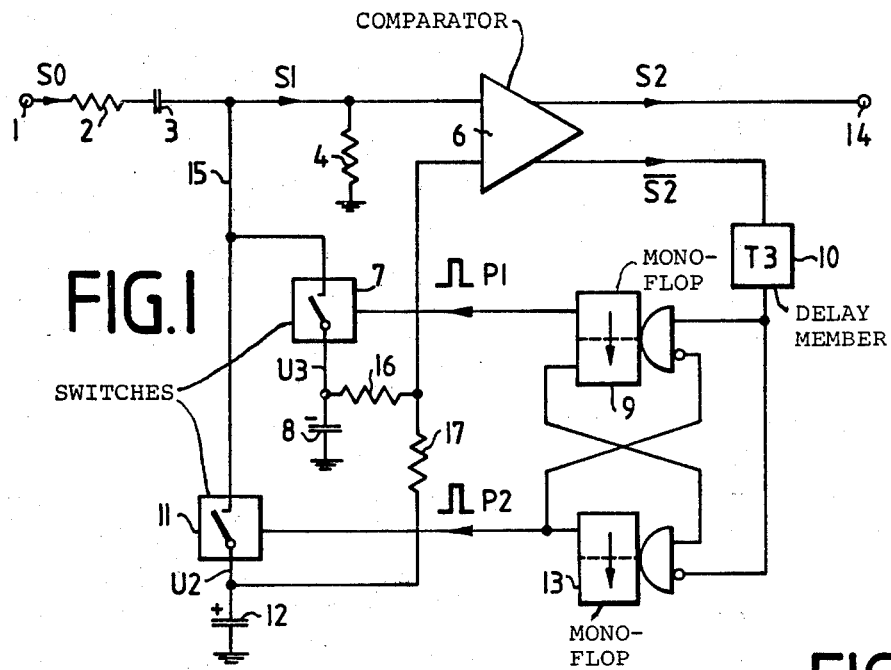
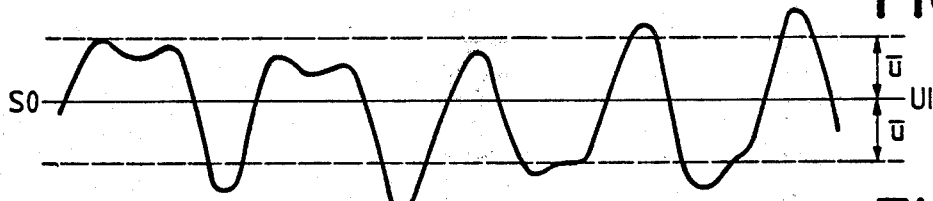
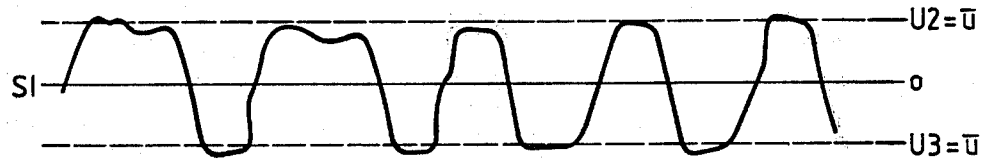
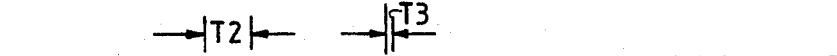

4,406,988

CIRCUIT FOR PROCESSING A DIGITAL SIGNAL

BACKGROUND OF THE INVENTION

The present invention relates to circuits for processing a useful signal which varies in amplitude between positive and negative values about a zero value and contains information in the locations of its zero passages.

During the transmission of digital signals over a transmission path, e.g. record disc, magnetic tape or wire, signal distortions generally occur. It is therefore necessary to process such a signal before evaluation. For digital signals, it is usually important, in this connection, to reconstruct the zero passages of the originally transmitted signal as accurately as possible.

SUMMARY OF THE INVENTION

It is the object of the present invention to provide a circuit for processing such digital signals in an improved manner.

The above and other objects are achieved, according to the invention, in a circuit of the above-mentioned type which includes: a zero passage detector having an input; a first capacitor connected in series between a source of the useful signal and the detector input; and means for coupling the useful signal with a first equalizing signal during the positive value intervals of the useful signal and with a second equalizing signal during the negative intervals of the useful signal, by constituting the signal coupling means by a source of the first equalizing signal; a source of the second equalizing signal; a first controllable switch connected to the source of the first equalizing signal for selectively coupling the first equalizing signal with the useful signal; a second controllable switch connected to the source of the second equalizing signal for selectively coupling the second equalizing signal with the useful signal; and control pulse generating means connected for applying to each switch control pulses derived from the useful signal and having a timing such that the first switch is closed for a predetermined period during each positive value interval of the useful signal and the second switch is closed for a predetermined period during each negative value interval of the useful signal, with the predetermined closing period of each switch being determined by the duration of the control pulses applied thereto.

BRIEF DESCRIPTION OF THE DRAWINGS

FIG. 1 is a block circuit diagram of a circuit for processing signals according to one preferred embodiment of the invention.

FIGS. 2 show waveforms representing the voltages appearing at various points in the circuit of FIG. 1.

DESCRIPTION OF THE PREFERRED EMBODIMENTS

Figure 3:
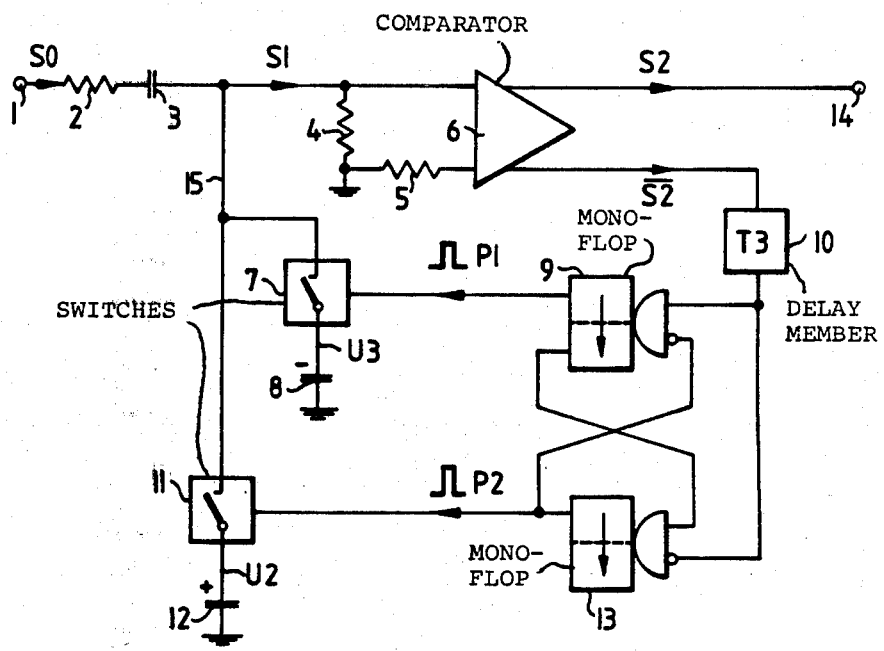
FIG. 3 is a view similar to that of FIG. 1 of another embodiment of the invention.

FIG. 1 shows a circuit for processing an incoming digital signal having the form, for example, shown in FIG. 2a. The incoming signal S0 lies at any desired direct voltage potential U1 and has an average peak value $\bar{u}$. In the illustrated example, interference in the signal is mainly of the low frequency type. Such interference may have been produced by frequency errors, stray phenomena or due to irregular pickup conditions during playback of a tape or a record.

The circuit includes a comparator 6 which serves as the zero passage detector. The upper input of the comparator receives an input signal S1, shown in FIG. 2b, derived from incoming signal S0 at input terminal 1, in a manner to be explained below, via a series connection of a resistor 2 and a capacitor 3. With respect to direct current, the upper input of the comparator 6 is connected to ground via a resistor 4. The input resistance of the comparator inputs is significantly greater than the resistance of resistor 4.

Either one of two potentials U2 and U3 can be applied to the upper input of the comparator 6 via a line 15 and by means of respective switches 7 and 11. The terminal potentials U3 and U2 are based on the voltages to which capacitors 8 and 12 are charged, and in the illustrated embodiment are equal to those voltages. The terminals of capacitors 8 and 12 directed away from switches 7 and 11 are connected to a fixed potential, i.e. to ground.

The lower, second input of comparator 6, which here serves as a comparison input, is connected to the sources of terminal potentials U3 and U2 via two resistors 16 and 17 having identical resistance values. Therefore, the comparison potential, and thus the threshold value of the comparator, always lies at the average value between the two terminal potentials U3 and U2.

These two terminal potentials constantly adapt themselves, as will be described below, to the two peak amplitude values of the signal present at the upper comparator input. Thus it is accomplished that the threshold value of the comparator is held substantially independently of a direct voltage component contained in the original signal, in the center between the two peak amplitude values of the incoming signal. The electronic circuit elements 7 and 11 are actuated by means of pulses in the following manner:

From the output signal of the comparator 6, in the illustrated embodiment the inverted output signal $\overline{S2}$, shown in FIG. 2d, control pulses P1 and P2, as shown in FIGS. 2e and 2f, respectively, are derived by means of two monoflop stages 9 and 13. The stages 9 and 13 are actuated in such a manner that each rising edge of the signal $\overline{S2}$ generates a pulse P1 of predetermined duration at the output of stage 9 and each descending edge generates a pulse P2 of predetermined duration at the output of stage 13. The two stages 9 and 13 are locked against one another in such a manner that the two pulses P1 and P2 can never occur simultaneously.

The outputs of stages 9 and 13 are connected so that the pulses P1 close the associated switch 7 during negative amplitude periods of the signal S1 at the input of the comparator 6 and the pulses P2 close the switch 11 during the positive amplitude periods of that signal.

The signal voltage S1 at the input of the comparator 6 and the terminal potentials U3 and U2 influence one another during the time that the respective switch 7 or 11 is conductive. However, the capacitance values of the capacitors 8 and 12 are given values which are so high, compared with the value of capacitor 3, that at the time of closing of the respective switch 7 or 11, the level of the signal is determined predominantly by the terminal potential at capacitor 8 or 12, respectively.

The terminal potentials adapt themselves relatively slowly, during several pulses of the input signal, to the average peak amplitudes of the signal S1. Conversely, the amplitude values of the signal S1 are shifted by the clamping processes in the direction toward the respective terminal potentials. Each zero passage of the signal S1 which in this way has been brought into coincidence with the comparator threshold value, causes a jump in level in the binary signal S2, shown in FIG. 2c, at the output 14 of the comparator 6. FIG. 2b shows the clamped signal S1 at the input of the comparator.

The time T1 shown in FIG. 2c is the shortest period between succeeding zero passages of input signal S1. FIGS. 2e and 2f show the control pulse trains P1 and P2 derived from the input signal of FIG. 2b. Each pulse P1 and P2 produced by stages 9 and 13 has a duration T2. A delay time T3 may occur due to the operation of stages 9 and 13 or may be produced by an additional delay member 10, shown in FIG. 1, in the signal path between the output of the comparator 6 and the inputs of stages 9 and 13. By adjusting the value of delay time T3, it is possible to predetermine how much time after a zero passage the actuation can take place. When selecting the values for T1, T2 and T3, it must be noted that the sum of T2 and T3 must not exceed the value of T1.

In selecting the circuit parameters, the conductive state resistance of the switches 7 and 11 must also be considered. The values for the resistances 2 and 4 and for the pulse duration T2 of the control pulses P1 and P2 must be optimized for the respective signal-to-noise ratios of the signals to be processed.

In the illustrated circuit, the cooperation of the switches 7 and 11 with resistor 2 also performs a blanking function. Noise and other high frequency interference superposed on the signal are blanked out during the clamping periods, i.e. during the conductive periods of switches 7 and 11. The signal shown in FIG. 2a is a signal in delay modulation or in the Miller code, respectively. This signal may contain a maximum direct voltage component of $\frac{1}{3}$ its zero-to-peak amplitude value.

For a biphase code, which does not contain a direct voltage component, the circuit shown in FIG. 3 can also be used. Here both comparator inputs are connected to the same reference potential, e.g. ground, via identical resistors 4 and 5. Since in this case the comparison potential of the comparator is at a fixed potential, the effect of the clamping circuit according to the invention can be checked with the aid of a so-called eye diagram.

It is known that the quality of a data signal can be determined with the aid of such an eye diagram. To do this, the horizontal sweep of an oscilloscope beam is triggered by a system clock pulse derived from the signal and the amplitude of the signal to be examined is shown in the Y direction on the oscilloscope. If the signal contains a line code in which changes in level are permissible only at fixed locations, or times, this pattern can be recognized by the accumulation of zero passages at corresponding points. Between the points of the signal pattern there are dark regions which are surrounded by the positive and negative halfwaves of the signal. The dark regions are greater, the more stable is the amplitude of the halfwaves. If, for a comparison, the signal S0 and the signal S1 are displayed in the "eye diagram", it can be seen that due to the substantially greater dark regions in the case of signal S1, this signal S1 is substantially more favorable for error-free signal evaluation.

In the circuit of FIG. 1, the eye diagram of signal S1 does not necessarily provide accurate information during the evaluation about possible interferance. When the direct voltage component changes in the original signal it would have to be considered that the position of the comparator threshold value also changes, namely in a manner favorable for the evaluation. The components of the circuit of FIGS. 1 and 3 may be dimensioned, for example, as follows:

resistor 2: 270 Ohm
resistors 4, 5: 1 kOhm
resistors 16, 17: 2.2 kOhm
capacitor 3: 3.3 nF
capacitor 8: 0.1 μF
capacitor 12: 0.1 μF
pulse duration T2: 400 ns
delay period T3: 90 ns These dimensions are based on a minimum distance of the changes in level in the useful signal of T1=580 ns.

For the comparator 6, the integrated circuit "μA 760" can be used, for the monostable flip stages, the integrated circuit 74C221 and for the switch elements 7 and 11 the integrated circuit 4066. Manufacturer of μA 760 is e.g. Fairchild, of HD-74C221 and HD-4066 is e.g. Harris.

It will be understood that the above description of the present invention is susceptible to various modifications, changes and adaptations, and the same are intended to be comprehended within the meaning and range of equivalents of the appended claims.

What is claimed is:

1. In a circuit for processing a useful signal which varies in amplitude between positive and negative values about a zero value and contains information in the locations of its zero passages, which circuit includes: a zero passage detector having an input; a first capacitor connected in series between a source of the useful signal and the detector input for supplying a signal representative of the useful signal; and means for coupling, at the detector input, the signal representative of the useful signal with a first clamping potential only during the positive value intervals of the signal representative of the useful signal and with a second clamping potential only during the negative intervals of the signal representative of the useful signal, the improvement wherein said circuit further comprises a source of the first clamping potential and a source of the second clamping potential, and said signal coupling means comprise: a first controllable switch connected to said source of the first clamping potential for selectively coupling the first clamping potential with the signal representative of the useful signal; a second controllable switch connected to said source of the second clamping potential for selectively coupling the second clamping potential with the signal representative of the useful signal; and control pulse generating means connected for applying to each said switch control pulses derived from the signal representative of the useful signal and having a timing such that said first switch is closed for a predetermined period during each positive value interval of the signal representative of the useful signal and said second switch is closed for a predetermined period during each negative value interval of the signal representative of the useful signal, with the predetermined closing period of each said switch being determined by the duration of the control pulses applied thereto.

2. An arrangement as defined in claim 1 wherein the control pulses applied to said first and second switches have identical durations.

3. An arrangement as defined in claim 1 or 2 wherein the amplitude of the useful signal is that of its voltage, said source of the first clamping potential comprises a second capacitor connected to said first switch and having a voltage thereacross which constitutes the first clamping potential, and said source of the second clamping potential comprises a third capacitor connected to said second switch and having a voltage thereacross which constitutes the second clamping potential.

4. An arrangement as defined in claim 3 wherein each of said second and third capacitors has a capacitance value substantially greater than that of said first capacitor.

5. An arrangement as defined in claim 3 further comprising a resistor having one end connected to a point of connection between said detector input and said first capacitor and its other end connected to a source of reference potential, and wherein each said switch is connected between its respective source and said detector input.

6. An arrangement as defined in claim 3 wherein said detector comprises a comparator having a signal input constituting said detector input, and a comparison input connected to receive a comparison signal constituting the average of the first and second clamping potentials.

7. An arrangement as defined in claim 6 wherein said second and third capacitors have identical capacitance values, and further comprising two resistors having identical resistance values and each connected between a respective one of said second and third capacitors and said comparison input for supplying the comparison signal thereto.

8. An arrangement as defined in claim 1 wherein said detector comprises a comparator having a signal input constituting said detector input, and a comparison input connected to a source of reference potential.

9. An arrangement as defined in claim 1 wherein said control pulse generating means comprise two monostable pulse generating devices each having an output connected for supplying control pulses to a respective one of said controllable switches, with one of said devices being connected to be triggered by each rising edge of the signal representative of the useful signal and the other of said devices being connected to be triggered by each descending edge of the signal representative of the useful signal.

10. An arrangement as defined in claim 9 wherein said control pulse generating means further comprise interconnection means connecting said devices together for permitting only one said device to supply a control pulse at any time.

11. An arrangement as defined in claim 9 wherein said devices are connected to be controlled by the output signal produced by said detector.

12. An arrangement as defined in claim 11 further comprising means for introducing a time delay between each edge in the output signal from said detector and triggering of each associated control pulse.

13. An arrangement as defined in claim 12 wherein the sum of said time delay and the duration of each control pulse is shorter than the duration of the shortest time between zero passages of the signal representative of the useful signal.

14. An arrangement as defined in claim 1 further comprising a resistor connected in series with said first capacitor for effecting at least partial blanking of interference present in the useful signal during periods when either one of said switches is closed.

15. An arrangement as defined in claim 1 wherein said control pulse generating means are connected to be controlled by the output signal produced by said detector.

* * * * *